US009827553B2

(12) United States Patent
Ohshima et al.

(10) Patent No.: US 9,827,553 B2
(45) Date of Patent: Nov. 28, 2017

(54) ALUMINA-BASED FIBROUS MASS, PROCESS FOR PRODUCING SAME, AND USE

(71) Applicants: DENKA COMPANY LIMITED, Tokyo (JP); SAFFIL LIMITED, Merseyside (GB)

(72) Inventors: Yasutaka Ohshima, Niigata (JP); Masaaki Watanabe, Niigata (JP); Masanori Hisamoto, Fukuoka (JP); Ryoetsu Yoshino, Niigata (JP); Kazutaka Fujita, Niigata (JP); Masataka Eguchi, Niigata (JP); Adam Kelsall, Merseyside (GB); Kelvin Weeks, Merseyside (GB); Jonathan Cross, Merseyside (GB)

(73) Assignees: DENKA COMPANY LIMITED, Tokyo (JP); SAFFIL LIMITED, Merseyside (GB)

( * ) Notice: Subject to any disclaimer, the term of this patent is extended or adjusted under 35 U.S.C. 154(b) by 0 days.

(21) Appl. No.: 14/439,985

(22) PCT Filed: Oct. 31, 2013

(86) PCT No.: PCT/JP2013/079600
§ 371 (c)(1),
(2) Date: Apr. 30, 2015

(87) PCT Pub. No.: WO2014/069589
PCT Pub. Date: May 8, 2014

(65) Prior Publication Data
US 2015/0251163 A1    Sep. 10, 2015

(30) Foreign Application Priority Data
Oct. 31, 2012  (JP) ................................ 2012-240883

(51) Int. Cl.
| | |
|---|---|
| *B01J 21/04* | (2006.01) |
| *C04B 35/626* | (2006.01) |
| *C04B 35/622* | (2006.01) |
| *B01J 21/12* | (2006.01) |
| *B01J 35/06* | (2006.01) |
| *B01J 37/00* | (2006.01) |
| *B01J 37/04* | (2006.01) |
| *B01J 37/08* | (2006.01) |
| *D04H 1/4209* | (2012.01) |

(52) U.S. Cl.
CPC .............. *B01J 21/04* (2013.01); *B01J 21/12* (2013.01); *B01J 35/06* (2013.01); *B01J 37/0018* (2013.01); *B01J 37/04* (2013.01); *B01J 37/082* (2013.01); *C04B 35/62236* (2013.01); *C04B 35/62245* (2013.01); *C04B 35/62675* (2013.01); *D04H 1/4209* (2013.01); *C04B 2235/3418* (2013.01); *C04B 2235/5409* (2013.01); *C04B 2235/606* (2013.01); *C04B 2235/6021* (2013.01); *C04B 2235/6562* (2013.01); *C04B 2235/77* (2013.01)

(58) Field of Classification Search
CPC ... B01J 21/04; B01J 21/12; B01J 35/06; B01J 37/00; B01J 37/04; B01J 37/08; C04B 35/626; C04B 35/622
See application file for complete search history.

(56) References Cited

U.S. PATENT DOCUMENTS

| | | | |
|---|---|---|---|
| 3,853,688 A | 12/1974 | D'Ambrosio | |
| 3,994,740 A | 11/1976 | Morton | |
| 4,047,965 A * | 9/1977 | Karst | ................ C04B 35/62245 |
| | | | 501/128 |
| 4,094,690 A | 6/1978 | Morton | |
| 2003/0127175 A1 | 7/2003 | Shoji et al. | |
| 2003/0203154 A1 | 10/2003 | Shoji et al. | |
| 2004/0234428 A1 | 11/2004 | Tanahashi et al. | |
| 2005/0227058 A1 | 10/2005 | Ohashi et al. | |
| 2009/0072498 A1 | 3/2009 | Tanahashi et al. | |
| 2009/0075812 A1 | 3/2009 | Tanahashi et al. | |
| 2009/0081442 A1 | 3/2009 | Tanahashi et al. | |
| 2009/0143217 A1 | 6/2009 | Tanahashi et al. | |

FOREIGN PATENT DOCUMENTS

| | | |
|---|---|---|
| CN | 1665974 A | 9/2005 |
| CN | 101538149 A | 9/2009 |
| CN | 101723682 A | 6/2010 |
| CN | 102167567 A | 8/2011 |
| EP | 0 066 627 A1 | 12/1982 |
| EP | 0 971 057 A1 | 1/2000 |
| EP | 2 949 791 A1 | 12/2015 |
| JP | S61-075818 A | 4/1986 |

(Continued)

OTHER PUBLICATIONS

International Search Report Dated Jan. 21, 2014 Issued in Application PCT/JP2013/079600.
Extended European Search Report issued in application No. 13851410.4 dated May 9, 2016.
First Office Action for Chinese Application No. 201380057137.4 mailed May 26, 2016.
Office Action issued on Feb. 21, 2017 in Chinese Patent Application No. 201380057137.4.
Office Action issued on Sep. 5, 2017 in corresponding Chinese Patent Application No. 201380057137.4.

*Primary Examiner* — Melvin C Mayes
*Assistant Examiner* — Michael Forrest
(74) *Attorney, Agent, or Firm* — Foley & Lardner LLP

(57) ABSTRACT

To provide an alumina-based fibrous mass having a high areal pressure and is usable as a holding material for an exhaust gas cleaners and a production process thereof; the alumina-based fibrous mass has a chemical composition containing an $Al_2O_3$ in an amount of 70% or more and less than 90% and having a total pore volume of 0.0055 mL/g or less.

1 Claim, No Drawings

(56) References Cited

FOREIGN PATENT DOCUMENTS

| | | |
|---|---|---|
| JP | H07-286514 A | 10/1995 |
| JP | 2000-080547 A | 3/2000 |
| JP | 2002-356380 A | 12/2002 |
| JP | 2005-344257 A | 12/2005 |
| JP | 2010-031416 A | 2/2010 |
| WO | WO-2004/003276 A1 | 1/2004 |

* cited by examiner

ALUMINA-BASED FIBROUS MASS, PROCESS FOR PRODUCING SAME, AND USE

TECHNICAL FIELD

The present invention relates to an alumina-based fibrous mass, and a process for producing and a use thereof.

BACKGROUND ART

Exhaust gas treatment devices have hitherto been used for the purpose of detoxifying the $NO_x$, PM, and the like contained in exhaust gases discharged from vehicle engines or from internal combustion engines of construction equipment and the like. Such exhaust gas treatment devices have a configuration where a catalyst support made of a ceramic or the like is housed in a catalyst casing having the structure of a metallic shell or the like. Usually, this configuration includes a holding material interposed between the catalyst support and the catalyst casing. The holding material has both the purpose of fixing the catalyst support to prevent any damage due to vibrations and the purpose of serving as an exhaust gas sealing material, and alumina-based fibrous masses are being mainly used (see, e.g., Patent Document 1).

The exhaust control was recently made stricter, and the exhaust gas cleaners have come to be required to have higher functions accordingly. Then the alumina-based fibrous masses as holding materials are coming to be required to retain a retention ability (areal pressure) under severer use conditions.

For example, Patent Document 2 discloses a process for producing an alumina-based fibrous mass by conducting, a spinning step, a chopping step, a mat formation step, and then a burning step. Namely, the production process described in Patent Document 2 is that the continuous long-fiber precursor obtained in the spinning step is cut with a cutter or the like in a state of being unburned and flexible, to thereby obtain a short-fiber precursor. It is stated that such alumina short fibers obtained through these steps have suffered little cut-surface chipping and have few microcracks as compared with alumina short fibers obtained through cutting performed after a burning treatment and hence have high mechanical strength and reduced unevenness and that, because of these, an alumina-based fibrous mass which has a sufficiently high initial areal pressure and is less apt to deteriorate with the lapse of time can be obtained.

Meanwhile, there is a method being investigated in which the volume of pores that are present in alumina-based fibers and have a diameter within a specific range is reduced in order to improve the mechanical strength of the alumina-based fibers (see Patent Document 3). However, the alumina-based fibrous masses disclosed therein are limited to ones which have chemical compositions including 90% or 95% $Al_2O_3$. The alumina-based fibrous mass described in Patent Document 3 is insufficient in areal pressure for use, for example, as a holding material for the exhaust gas cleaners of motor vehicles where intense vibrations occur. There is a desire for an alumina-based fibrous mass having a higher areal pressure.

PRIOR ART DOCUMENTS

Patent Documents

Patent Document 1: JP-A-H7-286514
Patent Document 2: JP-A-2002-356380
Patent Document 3: JP-A-S61-75818

SUMMARY OF THE INVENTION

Problem that the Invention is to Solve

An object of the invention is to provide an alumina-based fibrous mass having a high areal pressure and a process for producing the same.

Another object of the invention is to provide a holding material for exhaust gas cleaners which includes the alumina-based fibrous mass.

Means for Solving the Problem

The present inventors made investigations in order to overcome the problems. As a result, they have found that the decrease in areal pressure of an alumina-based fibrous mass occurs depending on vulnerable sites, such as pores or defects, which are attributable to any impurity present in the alumina-based fibrous mass or to production conditions. According to the finding by the present inventors, the decrease in areal pressure is caused when stress is imposed on the fibers and these vulnerable sites serve as starting points to readily fracture the fibers. Consequently, in order for an alumina-based fibrous mass to retain its inherent high areal pressure, the microstructure of the alumina-based fibrous mass should be dense and have no pores and no defects or the like.

The present inventors hence made investigations in order to make an alumina-based fibrous mass have a densified microstructure. As a result, they have found that a novel alumina-based fibrous mass which is remarkably excellent in terms of fiber strength and denseness and which has a high areal pressure as usable as a holding material for the exhaust gas cleaners of motor vehicles or the like can be formed by regulating both the amount of alumina to be incorporated and production conditions.

Namely, the present invention is as follows.

(1) An alumina-based fibrous mass having a chemical composition containing an $Al_2O_3$ in an amount of 70% or more and less than 90% and having a total pore volume of 0.0055 mL/g or less.

(2) The alumina-based fibrous mass according to (1), being an alumina-based fibrous mass containing two components of the $Al_2O_3$ and an $SiO_2$ as inorganic fibers, and having the chemical composition containing the $Al_2O_3$ in an amount of 70% or more and less than 90% and having the total pore volume of 0.0055 mL/g or less.

(3) The alumina-based fibrous mass according to (1) or (2), obtained by a production process containing (I) a step in which an inorganic fiber source and a spinning aid are mixed together and concentrated under a reduced pressure to obtain a viscous spinning dope, (II) a step in which the spinning dope is extruded through fine holes into the air and dried to obtain a precursor, and (III) a step in which the precursor is burned, in this order, in which,
the step of burning the precursor in the step (III) contains a degreasing step in which the burning is performed to 800° C. at a burning rate of 3° C./min or lower while performing evacuation at a rate of 0.1 to 3 $Nm^3$/h per kg of the precursor, and
a crystallization step in which after the degreasing step, the inorganic fiber source is burned and crystallized.

(4) The alumina-based fibrous mass according to any one of (1) to (3), having a mullite ratio of 5% or less.

(5) The alumina-based fibrous mass according to any one of (1) to (4), having a specific surface area of 5 m²/g or less.
(6) The alumina-based fibrous mass according to any one of (1) to (5), having an areal pressure of 90 N/cm² or higher when compressed to a bulk density of 0.5 g/cm³.
(7) The alumina-based fibrous mass according to any one of (1) to (5), having an areal pressure of 100 N/cm² or higher when compressed to a bulk density of 0.5 g/cm³.
(8) The alumina-based fibrous mass according to any one of (1) to (5), having an areal pressure of 40 N/cm² or higher when compressed to a bulk density of 0.4 g/cm³.
(9) The alumina-based fibrous mass according to any one of (1) to (5), having an areal pressure of 15 N/cm² or higher when compressed to a bulk density of 0.3 g/cm³.
(10) The alumina-based fibrous mass according to any one of (1) to (9), which is for use as a holding material for an automotive exhaust gas cleaner.
(11) A process for producing the alumina-based fibrous mass described in any one of (1) to (10), containing: (I) a step in which an inorganic fiber source and a spinning aid are mixed together and concentrated under a reduced pressure to obtain a viscous spinning dope, (II) a step in which the spinning dope is extruded through fine holes into the air and dried to obtain a precursor, and (III) a step in which the precursor is burned, in this order, in which,
the step of burning the precursor in the step (III) contains a degreasing step in which the burning is performed to 800° C. at a burning rate of 3° C./min or lower while performing evacuation at a rate of 0.1 to 3 Nm³/h per kg of the precursor, and
a crystallization step in which after the degreasing step, the inorganic fiber source is burned and crystallized.
(12) A holding material for an exhaust gas cleaner containing the alumina-based fibrous mass described in any one of (1) to (10).

Effects of the Invention

The alumina-based fibrous mass of the present invention has a high areal pressure and hence is suitable for use as a holding material for the exhaust gas cleaners of motor vehicles or the like. Furthermore, since this alumina-based fibrous mass is obtained by an easy process using conventional apparatus, the production efficiency is satisfactory.

MODES FOR CARRYING OUT THE INVENTION

The alumina-based fibrous mass of the present invention has a chemical composition containing $Al_2O_3$ in an amount of 70% or more and less than 90%, and has a total pore volume of 0.0055 mL/g or less.

The alumina-based fibrous mass of the present invention is explained below in detail.

The chemical composition of the alumina-based fibrous mass of the present invention contains $Al_2O_3$ in an amount of 70% or more and less than 90%. In the case where $Al_2O_3$ is 90% or more, sufficient fiber strength cannot be obtained, resulting in a decrease in areal pressure. On the other hand, in the case of less than 70%, heat resistance is low and hence, it suffers considerable fiber deterioration due to high-temperature exhaust gas when used as a holding material for the automotive exhaust gas. The chemical composition of the alumina-based fibrous mass is more preferably that contains $Al_2O_3$ in an amount of 72% or more and 80% or less.

The alumina-based fibrous mass of the present invention may contain $SiO_2$, $Fe_2O_3$, MgO, CuO, $Na_2O$, ZnO, CaO and the like as components other than $Al_2O_3$. Among those, it is preferable to contain $SiO_2$ as an inorganic fiber. It is especially preferable that the alumina-based fibrous mass of the present invention should be one composed of two components of $Al_2O_3$ and $SiO_2$ as inorganic fibers. By being composed to contain $SiO_2$, coarse crystals of α-alumina are inhibited from growing and areal pressure is improved.

The chemical composition of an alumina-based fibrous mass can be measured by using a fluorescent X-ray spectroscopy and the like.

The alumina-based fibrous mass of the present invention preferably has a mineralogical composition where the proportion of mullite ($3Al_2O_3 \cdot 2SiO_2$), that is, the mullite ratio, should be 5% or less. In the case where the mullite ratio exceeds 5%, fiber strength is reduced, resulting in a decrease in areal pressure.

The mineralogical composition of the alumina-based fibrous mass of the present invention can be identified and determined by X-ray powder diffractometry, which is explained below in detail.

A measurement is made with an X-ray diffractometer (e.g., multiflexs, manufactured by RIGAKU Corp.) under the conditions of a tube voltage of 30 kV, a tube current of 40 mA and a speed of 2°/min, and the height h of the peak at 2θ=40.9°, which is assigned to mullite, is read out. Besides, under the same conditions, a mullite standard substance (e.g., standard substance JCRM-R041, certified by the Ceramic Society of Japan) is measured, and the height $h_0$ at 2θ=40.9° is read out. The mullite ratio in this analysis is the value represented by equation (1).

Mineralogical composition (Mullite ratio)=$h/h_0 \times 100$.  Equation (1):

The alumina-based fibrous mass of the present invention has a total pore volume of 0.0055 mL/g or less, and preferably 0.003 mL/g or less. By regulating the total pore volume equal to or less than that value, a high areal pressure can be achieved. That value of total pore volume is attained only when the production conditions which will be described later are employed.

Furthermore, the alumina-based fibrous mass of the present invention has a specific surface area of preferably 5 m²/g or less, and more preferably 2 m²/g or less. Too large specific surface areas may result in cases where the alumina-based fibrous mass has a considerable brittleness and a sufficient areal pressure is difficult to obtain.

The pore diameter distribution, total pore volume and specific surface area of the alumina-based fibrous mass of the present invention can be measured by a gas adsorption-desorption method, which is described below in detail.
(Sample Preparation)
A 50-g portion of an alumina-based fibrous mass produced is weighed out. The alumina-based fibrous mass weighed is introduced into a bottomed cylindrical cylinder having an inner diameter of 80 mm, and is compressed at a pressure of 2,058 N/cm². The pressure is once removed, and the fibers within the cylinder are loosened and then compressed again at the same pressure. The compressed sample is sieved with a 600-μm sieve. A 3-g portion is collected from the sample which has passed through the sieve, and is subjected to a measurement.
(Measurement)
For the measurement, a gas adsorption-desorption analyzer (e.g., OMNISORP 360 CX, manufactured by Beckman Coulter, Inc.) is used. Evacuation is conducted at 100° C. for 14 hours, and nitrogen gas is used as an adsorbate gas at a flow rate of 0.3 mL/min to conduct an adsorption-desorption measurement by a continuous volume method. Incidentally, the method used for determining a pore diameter distribution is the BJH method.

The total pore volume in the present invention is the sum of the volumes of pores each having a radius of 0.01 μm or larger.

In the case of being used as a holding material for a catalyst support, the alumina-based fibrous mass is introduced, generally in a state of having been compressed to a bulk density in the range of 0.3 to 0.5 g/cm$^3$, into a catalyst casing, such as a metallic shell, in which a catalyst support made of a ceramic has been housed. If a sufficiently high areal pressure cannot be retained within this bulk density range, there is a possibility that the retention ability is insufficient and the catalyst support made of a ceramic might be damaged by vibrations during use. Because of this, in order to make usable as a holding material for the exhaust gas cleaners of motor vehicles or the like, in which especially intensive vibrations occur, the alumina-based fibrous mass has an areal pressure of preferably 15 N/cm$^2$ or higher when the bulk density is 0.3 g/cm$^3$, and preferably 40 N/cm$^2$ or higher when the bulk density is 0.4 g/cm$^3$. Furthermore, when the bulk density is 0.5 g/cm$^3$, it is preferably 90 N/cm$^2$ or higher, and more preferably 100 N/cm$^2$ or higher.

Areal pressure in the present invention can be measured by using a tension-compression tester. A method for the measurement is explained below in detail.

For the measurement, a tension-compression tester (e.g., Autograph, manufactured by Shimadzu Corp.) is used. The alumina-based fibrous mass is punched out to a cylindrical shape having a bottom area of 10.2 cm$^2$ and compressed at a test speed of 10 mm/min. The repulsive forces at a bulk density of 0.3, 0.4, and 0.5 g/cm$^3$ are measured. By multiplying each repulsive force by the bottom area, the areal pressure can be determined.

The process for producing the alumina-based fibrous mass, which has the properties described above, is explained below in detail.

The process of the present invention for producing the alumina-based fibrous mass contains:

(I) a step in which an inorganic fiber source (an alumina source, a silica source) and a spinning aid are mixed together and concentrated under reduced pressure to obtain a viscous spinning dope;

(II) a step in which the spinning dope is extruded through fine holes into the air and dried to obtain a precursor; and (III) a step in which the precursor is burned.

In the step of obtaining a spinning dope, use can be made of an aqueous aluminum oxychloride solution, an alumina sol, or the like as the alumina source, and use can be made of, for example, a silica sol, polysiloxane, or the like as the silica source. Further, polyvinyl alcohol, polyethylene glycol, or the like can be used as the spinning aid. These are mixed in a desired proportion and concentrated under reduced pressure, thereby obtaining a spinning dope.

Next, the spinning dope prepared is extruded through fine holes into the air, giving a precursor. There are no particular limitations on the spinning device to be used in this step, and use can be made of a blowing spinning device, rotating-disk spinning device, or the like. From the standpoint of preventing the fibers extruded through the fine holes from fusion-bonding to one another and thereby producing an alumina-based fibrous mass having a high areal pressure, the spinning method described in JP-A-2010-31416 is suitable for use.

The precursor obtained is burned. The step of burning is especially important when the alumina-based fibrous mass of the present invention is produced.

In the burning step in the present invention, a degreasing step and a crystallization step are performed in this order.

The burning rate in the degreasing step is 3° C./min or lower. In the degreasing step, not only the water, hydrochloric acid contents and organic substances contained in the precursor undergo decomposition reactions but also products of the burning are yielded, to thereby rapidly reduce the volume of the precursor. In the case where the burning rate is larger than 3° C./min, the decompositions of the water, hydrochloric acid contents, and organic substances do not proceed sufficiently before the volume reduction occurs. As a result, fibers having a large number of defects are yielded, resulting in a considerable decrease in areal pressure. In the degreasing step, burning is conducted at a burning rate of 3° C./min or lower until the temperature reaches 800° C.

In the degreasing step, evacuation is performed at a rate of 0.1 to 3 Nm$^3$/h per kg of the precursor. In the case where the evacuation rate is less than 0.1 Nm$^3$/h, the decomposition gas circulates in the furnace and the decomposition reactions are not accelerated, thereby yielding fibers which have a large number of defects and resulting in a decrease in areal pressure. On the other hand, in the case where the evacuation rate is higher than 3 Nm$^3$/h, the quantity of heat which is removed by the evacuation increases, making it difficult to control the internal temperature of the furnace and rendering even heating impossible. By controlling the burning rate and the evacuation rate in the degreasing step, the pore structure of the alumina-based fibrous mass can be controlled and a microstructure having a total pore volume of 0.0055 mL/g or less can be formed.

In the crystallization step, the mineralogical composition of the alumina-based fibrous mass can be controlled by changing the maximum burning temperature.

The crystallization step in the present invention is enough to conduct a burning under ordinary conditions (temperature, holding period) which result in crystallization of the inorganic-fiber source. However, from the standpoint of attaining a heat-resistance temperature and excellent areal pressure suitable for use as a holding material for exhaust gas cleaners, it is preferable that in the step, it is held at a maximum burning temperature of 1,000 to 1,230° C. for 5 to 60 minutes. In the case where the crystallization temperature is lower than 1,000° C., there may be cases where the alumina-based fibrous mass has lowered heat resistance and is unsuitable for the use temperatures of holding materials for exhaust gas cleaners. Meanwhile, in the case of higher than 1,230° C., there may be cases where the crystallization of the alumina-based fibrous mass, such as conversion into mullite, proceeds excessively, resulting in a decrease in fiber strength and a decrease in areal pressure. In the case where the holding period at the maximum temperature is shorter than 5 minutes, there may be cases where the crystallization does not proceed sufficiently, resulting in unevenness in burning and a decrease in the areal pressure of the alumina-based fibrous mass. In the case where the holding period is longer than 60 minutes, there may be cases where the crystal growth of the alumina-based fibers proceeds to result in a decrease in areal pressure.

So long as the burning rate and evacuation conditions in the degreasing step and crystallization step described above can be satisfied, there are no particular limitations on the device(s) to be used for the burning. For example, a batch furnace such as a Kanthal furnace or a Siliconit furnace, a continuous furnace such as a roller-hearth furnace or a mesh-belt furnace, or the like is suitable for use. It is also possible to use these burning devices in a suitable combination as necessary.

The alumina-based fibrous mass of the present invention can be used as a holding material for exhaust gas cleaners, and is especially suitable as a holding material for automotive exhaust gas cleaners. Besides being usable in these applications, it can be used also as a heat or sound insulator, a filler for plastics, films or the like, strengthening material, or a reinforcing material for improving tensile strength or wear strength.

The present invention also provides a holding material for exhaust gas cleaners, which contains the alumina-based fibrous mass of the present invention. The holding material for exhaust gas cleaners can be produced, for example, by adding an inorganic binder or an organic binder to the alumina-based fibrous mass of the present invention and molding them by a wet process.

EXAMPLES

Example 1-1

A 3,650-g portion of an aqueous aluminum oxychloride solution having an $Al_2O_3$ concentration of 20.0% by mass was mixed with 1,286 g of a silica sol having an $SiO_2$ concentration of 21% by mass and 800 g of an aqueous polyvinyl alcohol (polymerization degree: 1,700) solution (concentration: 10% by mass), followed by concentrating under a reduced pressure to prepare a spinning dope having a viscosity of 3,500 mPa·s.

From a diameter of 0.2 mm (hole-to-hole distance: 3.5 mm) formed in the sidewall of a hollow disk which had a diameter of 350 mm and was being rotated at a rotational speed of 2,600 rpm, the spinning dope was ejected to form liquid fibers, which were then conveyed, while being suspended in and dried with 200° C. hot air, to a collection chamber of the type in which suction was conducted from below. Thus, precursor fibers were accumulated.

They were burned by using a roller-hearth furnace in the air. The burning consisted of the degreasing step up to an ambient temperature of 800° C. in which the temperature was continuously raised at a rate of 3° C./min while performing evacuation at a rate of 1.5 $Nm^3/h$ per kg of the precursor, and the crystallization step from above 800° C. to 1,200° C. in which the temperature was raised at a rate of 20° C./min and held at 1,200° C. for 30 minutes.

(A) Example 1-2 and Comparative Examples 1-1 and 1-2

Alumina-based fibrous masses were produced in the same manner as in Example 1-1, except that the chemical composition was changed. The properties of the alumina-based fibrous masses obtained are shown in Table 1.

TABLE 1

| | | Example 1-1 | Example 1-2 | Comp. Ex. 1-1 | Comp. Ex. 1-2 |
|---|---|---|---|---|---|
| Chemical composition | $Al_2O_3$ (%) | 73 | 70 | 95 | 60 |
| Burning conditions | Rate of burning to 800° C. (° C./min) | 3 | 3 | 3 | 3 |
| | Maximum burning temperature (° C.) | 1200 | 1200 | 1200 | 1200 |
| | Period of holding at maximum burning temperature (min) | 30 | 30 | 30 | 30 |
| | Evacuation condition per kg of precursor ($Nm^3/h$) | 1.5 | 1.5 | 1.5 | 1.5 |
| Properties | Total pore volume (mL/g) | 0.0015 | 0.0018 | 0.0023 | 0.0012 |
| | Specific surface area ($m^2/g$) | 0.8 | 0.7 | 2.6 | 0.6 |
| | Mullite ratio (%) | 2 | 2 | 1 | 3 |
| | Areal pressure ($N/cm^2$) in compression at 0.5 $g/cm^2$ | 110 | 106 | 65 | 92 |
| | Areal pressure ($N/cm^2$) in compression at 0.4 $g/cm^2$ | 45 | 41 | 29 | 35 |
| | Areal pressure ($N/cm^2$) in compression at 0.3 $g/cm^2$ | 20 | 19 | 11 | 14 |
| Remarks | | | | | Heat resistance decreased |

(B) Example 2-1 and Comparative Example 2-1

Alumina-based fibrous masses were produced in the same manner as in Example 1-1, except that the burning rate in the degreasing step was changed. The properties of the alumina-based fibrous masses obtained are shown in Table 2.

TABLE 2

| | | Example 1-1 | Example 2-1 | Comp. Ex. 2-1 |
|---|---|---|---|---|
| Chemical composition | $Al_2O_3$ (%) | 73 | 73 | 73 |
| Burning conditions | Rate of burning to 800° C. (° C./min) | 3 | 2 | 10 |
| | Maximum burning temperature (° C.) | 1200 | 1200 | 1200 |
| | Period of holding at maximum burning temperature (min) | 30 | 30 | 30 |
| | Evacuation condition per kg of precursor ($Nm^3/h$) | 1.5 | 1.5 | 1.5 |
| Properties | Total pore volume (mL/g) | 0.0015 | 0.0012 | 0.0058 |
| | Specific surface area ($m^2/g$) | 0.8 | 0.7 | 6.4 |
| | Mullite Ratio (%) | 2 | 2 | 2 |
| | Areal pressure ($N/cm^2$) in compression at 0.5 $g/cm^2$ | 110 | 112 | 87 |
| | Areal pressure ($N/cm^2$) in compression at 0.4 $g/cm^2$ | 45 | 50 | 29 |
| | Areal pressure ($N/cm^2$) in compression at 0.3 $g/cm^2$ | 20 | 25 | 12 |

(C) Examples 3-1 and 3-2 and Comparative Examples 3-1 and 3-2

Alumina-based fibrous masses were produced in the same manner as in Example 1-1, except that the rate of evacuation per kg of the precursor was changed. The properties of the alumina-based fibrous masses obtained are shown in Table 3.

TABLE 3

|  |  | Example 1-1 | Example 3-1 | Example 3-2 | Comp. Ex. 3-1 | Comp. Ex. 3-2 |
|---|---|---|---|---|---|---|
| Chemical composition | $Al_2O_3$ (%) | 73 | 73 | 73 | 73 | 73 |
| Burning conditions | Rate of burning to 800° C. (° C./min) | 3 | 3 | 3 | 3 | 3 |
|  | Maximum burning temperature (° C.) | 1200 | 1200 | 1200 | 1200 | 1200 |
|  | Period of holding at maximum burning temperature (min) | 30 | 30 | 30 | 30 | 30 |
|  | Evacuation condition per kg of precursor ($Nm^3/h$) | 1.5 | 0.1 | 3 | 0.01 | 10 |
| Properties | Total pore volume (mL/g) | 0.0015 | 0.0037 | 0.0014 | 0.0072 | 0.0061 |
|  | Specific surface area ($m^2/g$) | 0.8 | 0.8 | 0.6 | 5.6 | 0.8 |
|  | Mullite ratio (%) | 2 | 2 | 2 | 2 | 2 |
|  | Areal pressure ($N/cm^2$) in compression at 0.5 $g/cm^2$ | 110 | 103 | 98 | 87 | 82 |
|  | Areal pressure ($N/cm^2$) in compression at 0.4 $g/cm^2$ | 45 | 42 | 44 | 37 | 33 |
|  | Areal pressure ($N/cm^2$) in compression at 0.3 $g/cm^2$ | 20 | 18 | 19 | 14 | 12 |

(D) Examples 4-1 to 4-4 and Comparative Examples 4-1 and 4-2

Alumina-based fibrous masses were produced in the same manner as in Example 1-1, except that the maximum burning temperature and holding period in the crystallization step were changed. The properties of the alumina-based fibrous masses obtained are shown in Table 4.

TABLE 4

|  |  | Ex. 1-1 | Ex. 4-1 | Ex. 4-2 | Ex. 4-3 | Ex. 4-4 | Comp. Ex. 4-1 | Comp. Ex. 4-2 |
|---|---|---|---|---|---|---|---|---|
| Chemical composition | $Al_2O_3$ (%) | 73 | 73 | 73 | 73 | 73 | 73 | 73 |
| Burning conditions | Rate of burning to 800° C. (° C./min) | 3 | 3 | 3 | 3 | 3 | 3 | 3 |
|  | Maximum burning temperature (° C.) | 1200 | 1230 | 1000 | 1200 | 1200 | 1250 | 1500 |
|  | Period of holding at maximum burning temperature (min) | 30 | 30 | 30 | 5 | 60 | 30 | 30 |
|  | Evacuation condition per kg of precursor ($Nm^3/h$) | 1.5 | 1.5 | 1.5 | 1.5 | 1.5 | 1.5 | 1.5 |
| Properties | Total pore volume (mL/g) | 0.0015 | 0.0011 | 0.0038 | 0.0032 | 0.0012 | 0.0041 | 0.0001 |
|  | Specific surface area ($m^2/g$) | 0.8 | 0.3 | 3.2 | 3.4 | 0.2 | 0.3 | 0.2 |
|  | Mullite ratio (%) | 2 | 5 | 1 | 2 | 2 | 10 | 50 |
|  | Areal pressure ($N/cm^2$) in compression at 0.5 $g/cm^2$ | 110 | 103 | 98 | 92 | 94 | 85 | 78 |
|  | Areal pressure ($N/cm^2$) in compression at 0.4 $g/cm^2$ | 45 | 42 | 41 | 40 | 42 | 28 | 16 |
|  | Areal pressure ($N/cm^2$) in compression at 0.3 $g/cm^2$ | 20 | 17 | 18 | 16 | 15 | 11 | 12 |
| Remarks |  |  |  |  |  |  | Areal pressure decreased due to too high mullite ratio | Areal pressure decreased due to too high mullite ratio |

(E) Reference Example

For reference, commercial products of alumina-based fibers (commercial product A and commercial product B) were measured for total pore volume, specific surface area, mullite ratio, and areal pressure, and the results thereof are shown in Table 5.

TABLE 5

| | | Example 1-1 | Commercial product A | Commercial product B |
|---|---|---|---|---|
| Chemical composition | $Al_2O_3$ (%) | 73 | 72 | 80 |
| Properties | Total pore volume (mL/g) | 0.0015 | 0.0061 | 0.0059 |
| | Specific surface area ($m^2/g$) | 0.8 | 0.6 | 0.2 |
| | Mullite ratio (%) | 2 | 2 | 1 |
| | Areal pressure ($N/cm^2$) in compression at 0.5 $g/cm^2$ | 110 | 85 | 65 |
| | Areal pressure ($N/cm^2$) in compression at 0.4 $g/cm^2$ | 45 | 42 | 32 |
| | Areal pressure ($N/cm^2$) in compression at 0.3 $g/cm^2$ | 20 | 18 | 12 |

From the results shown in Table 1 to Table 5, it can be seen that the alumina-based fibrous mass of the present invention can be produced only when a specific $Al_2O_3$ incorporation amount and specific production conditions are used in combination. According to this production process of the present invention, an alumina-based fibrous mass which exhibits a high areal pressure can be easily produced by using conventional devices or the like. Meanwhile, since the areal pressure decreases considerably when the mullite ratio exceeds 5%, it is desirable to inhibit the mullite ratio from exceeding 5%, by regulating the temperature and holding period during the crystallization step.

While the present invention has been described in detail and with reference to specific embodiments thereof, it will be apparent to one skilled in the art that various changes and modifications can be made therein without departing from the spirit and scope thereof.

This application is based on a Japanese patent application filed on Oct. 31, 2012 (Application No. 2012-240883), the entire contents thereof being incorporated herein by reference. Furthermore, all the references cited herein are incorporated herein as a whole.

INDUSTRIAL APPLICABILITY

Since the alumina-based fibrous mass of the present invention has a dense structure and a high areal pressure as compared with conventional alumina-based fibers, it can be used, for example, as a holding material of the exhaust gas cleaner of a motor vehicle or the like.

The invention claimed is:

1. A process for producing the alumina-based fibrous mass having a chemical composition comprising an $Al_2O_3$ in an amount of 70 weight % or more and less than 90 weight % and having a total pore volume of 0.0055 mL/g or less, comprising: (I) a step in which an inorganic fiber source and a spinning aid are mixed together and concentrated under a reduced pressure to obtain a viscous spinning dope, (II) a step in which the spinning dope is extruded through fine holes into the air and dried to obtain a precursor, and (III) a step in which the precursor is burned, in this order, wherein,
  the step of burning the precursor in said step (III) comprises
  a degreasing step in which the burning is performed to 800° C. at a burning rate of 3° C./min or lower while performing evacuation at a rate of 0.1 to 3 $Nm^3/h$ per kg of the precursor, and
  a crystallization step in which after the degreasing step, the inorganic fiber source is burned and crystallized.

* * * * *